United States Patent [19]

Fujita et al.

[11] 4,358,428

[45] Nov. 9, 1982

[54] METHOD OF REMOVING NITROGEN OXIDES FROM WASTE GAS BY SELECTIVE CONTACT REDUCTION

[75] Inventors: Tadashi Fujita; Shigeo Soejima, both of Nagoya, Japan

[73] Assignee: NGK Insulators, Ltd., Nagoya, Japan

[21] Appl. No.: 55,977

[22] Filed: Jul. 9, 1979

Related U.S. Application Data

[63] Continuation of Ser. No. 881,694, Feb. 27, 1978, abandoned, which is a continuation of Ser. No. 751,598, Dec. 17, 1976, abandoned.

[30] Foreign Application Priority Data

Dec. 24, 1975 [JP] Japan .................................. 50-154506

[51] Int. Cl.$^3$ ............................................. B01D 53/36
[52] U.S. Cl. .................................. 423/239; 423/212; 252/477 R
[58] Field of Search ............... 423/212, 213.2, 239 A; 252/477; 264/59

[56] References Cited

U.S. PATENT DOCUMENTS

| | | | |
|---|---|---|---|
| 3,502,596 | 3/1970 | Sowards | 264/59 X |
| 3,565,830 | 2/1971 | Keith et al. | 423/212 |
| 3,864,451 | 2/1975 | Lee et al. | 423/239 |
| 3,922,412 | 11/1975 | Yoshikawa et al. | 423/213.5 X |
| 3,958,058 | 7/1974 | Elmer | 252/477 R |
| 4,026,992 | 5/1977 | Shiga et al. | 423/239 A |

FOREIGN PATENT DOCUMENTS

| | | | |
|---|---|---|---|
| 50-62683 | 5/1975 | Japan | 423/235 |
| 1210867 | 11/1970 | United Kingdom | 423/213.2 |

*Primary Examiner*—G. O. Peters
*Attorney, Agent, or Firm*—Stevens, Davis, Miller & Mosher

[57] ABSTRACT

A method of removing nitrogen oxides from waste gas exhausted from a heat power plant and any other various kinds of workshops, etc. is disclosed. The method comprises bringing the waste gas into contact with a honeycomb-shaped catalyst under the following three conditions, i.e.

(1) a hydraulic diameter of each of the channels extending through the honeycomb-shaped catalyst is larger than 2.0 mm, preferably 2.0 mm to 30 mm,
(2) an open frontal area is larger than 50%, preferably 50% to 80%, and
(3) a waste gas speed is higher than 0.5 m/sec, preferably 0.5 m/sec to 60 m/sec.

1 Claim, 1 Drawing Figure

U.S. Patent         Nov. 9, 1982         4,358,428
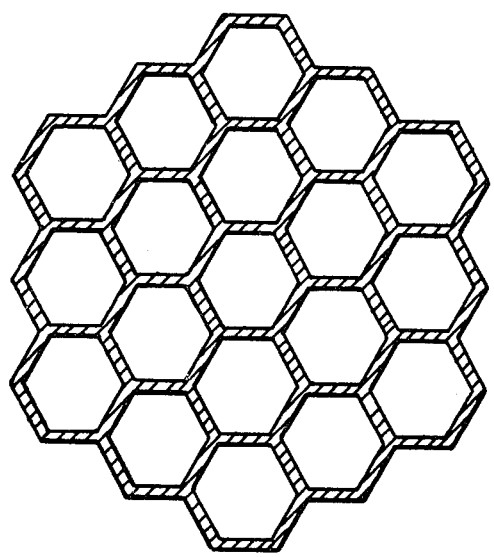

METHOD OF REMOVING NITROGEN OXIDES FROM WASTE GAS BY SELECTIVE CONTACT REDUCTION

This is a continuation of application Ser. No. 881,694 filed Feb. 27, 1978 (now abandoned) which was a continuation of Ser. No. 751,598 filed Dec. 17, 1976 (now abandoned).

This invention relates to a method of removing nitrogen oxides from waste gas exhausted from a heat power plant and any other various kinds of workshops, etc. by bringing the waste gas together with ammonia gas added thereto into contact with a catalyst and subjecting said gas to selective contact reduction.

In the remainder of the specification, the term "honeycomb" shall be understood to mean a structure having a multiplicity of parallel channels extending therethrough with each of said channels being bounded by a partition wall which is substantially uniform in thickness.

Waste gas exhausted from a heat power plant and any other various kinds of workshops, etc. contains a substantial amount of nitrogen oxides such as nitrogen monoxide, nitrogen dioxide, etc. Such nitrogen oxides result in public pollution such as photochemical smog, etc. and constitutes a vital social problem.

In order to reduce the content of nitrogen oxides contained in waste gas, attempts have been made to use a fuel having a high purity or to improve combustion systems, but such prior art methods require an apparatus which is complex in construction and expensive, can decrease a concentration of nitrogen oxides in waste gas only to the order of at most 50 ppm, and which could not obtain waste gas which does not contain nitrogen oxides at all. Thus, hitherto no method has led to fully satisfactory results.

Heretofore, it has been the common practice to remove nitrogen oxides from waste gas by bringing waste gas and a reducing gas, for example, ammonia gas added thereto into contact with a catalyst and by promoting selective contact reduction. In this case, the ammonia gas used as the reducing gas tends to selectively and easily reduce the nitrogen oxides, but is difficult to react with oxygen. This selective reduction method makes use of a catalyst formed of noble metal such as platinum, palladium, etc. and oxides such as iron oxide, vanadium oxide, copper oxide, chromium oxide, etc. Such catalyst is usually impregnated into a carrier having a large specific surface area, for example, γ-alumina and the carrier impregnated with the catalyst thus obtained or its kneaded shaped product is then dried and sintered. Pellet-shaped, bead-shaped or honeycomb-shaped catalyst (carrier) is charged into or mounted on a reactor through which are passed waste gases together with ammonia gas at a given temperature to reduce the nitrogen oxides into nitrogen and water, thus purifying the exhausted gas.

In practice, however, such prior art method has the following two important disadvantages. In the first place, the use of the bead-shaped, pellet-shaped or honeycomb-shaped catalyst having channels which are small in diameter involves a large pressure drop and could not provide a catalyst bed having a large thickness. For example, in the case of removing nitrogen oxide from waste gas exhausted from a boiler by using a bead-shaped catalyst having a diameter on the order of 7 mm, the pressure drop becomes higher than 200 mm pressure head per 1 m of thickness of the catalyst bed at a waste gas speed on the order of 0.5 m/sec. In practice, an allowable pressure drop is at most 200 mm pressure head, and as a result, in order to treat a substantial amount of waste gas at a waste gas speed of higher than 10 m/sec, a waste gas duct is required to be enlarged to reduce the gas speed and make the thickness of the catalyst bed smaller than 1 m to extend the thin catalyst bed over a wide area. As a result, the apparatus practicing such prior art method becomes extremely large in size and takes up much space and hence is not economical.

Secondly, accumulation of soot and dust contained in waste gas would be so great that the bead-shaped catalyst bed, pellet-shaped catalyst bed or honeycomb-shaped catalyst having channels which are small in diameter is clogged with the soot and dust. That is, the soot and dust contained in the waste gas are adhered onto the catalyst to degrade the property of the catalyst of removing nitrogen oxides and clog the gas flow passages of the catalyst bed with the soot and dust, thus increasing the pressure drop. In order to obviate such advantages, a method of circulating a flow of catalyst particles has been proposed. But, such method is not advisable from the technical and economical standpoints.

The pressure drop produced in the honeycomb-shaped catalyst is substantially smaller than that produced in the bead-shaped or pellet-shaped catalyst, so that the honeycomb-shaped catalyst may be used at a relatively high waste gas speed. But, if a honeycomb-shaped catalyst each of whose channels has a small hydraulic diameter is used, the channels are clogged with soot and dust contained in the waste gas, thereby increasing the pressure drop.

In the following, the term hydraulic diameter of channels shall be understood to mean "(cross-sectional area of a channel × 4/length of inner periphery of the channel)".

An object of the invention, therefore, is to provide a method of removing nitrogen oxides from waste gas which can completely obviate troubles arising from the use of conventional bead-shaped, pellet-shaped and honeycomb-shaped catalysts and can efficiently remove nitrogen oxides from waste gas at a high waste gas speed without clogging the catalyst bed.

A feature of the invention is the provision of a method of removing nitrogen oxides from waste gas by selective contact reduction, comprising bringing the waste gas together with ammonia gas added thereto into contact with a honeycomb-shaped catalyst formed of a honeycomb-structural body under conditions that a hydraulic diameter of channels extending through the honeycomb-shaped catalyst is larger than 2.0 mm, that an open frontal area is larger than 50%, and that a waste gas speed is higher than 0.5 m/sec.

The invention is based on recognitions that the use of a honeycomb-shaped structural body whose pressure drop is substantially smaller than that of bead-shaped or pellet-shaped catalyst provides the important advantage that the channels are prevented from being clogged with soot and dust, etc. contained in waste gas and that nitrogen oxides can be removed at a high waste gas speed and in high yield by synergetic effect of the hydraulic diameter, open frontal area and gas speed as defined above.

Experimental tests have yielded the result that excellent denitration effect is obtained by synergetic effect of the following three conditions, i.e.

(1) the hydraulic diameter of each of the channels of the honeycomb-shaped catalyst is 2.0 mm to 30 mm,
(2) the open frontal area is 50% to 80%, and
(3) the waste gas speed is 0.5 m/sec to 60 m/sec, and that the excellent denitration effect disappears if any one of the above three conditions is not satisfied.

In the method according to the invention, let SV (space velocity, i.e. the amount of gas in m$^3$ that is passed per 1 hr across 1 m$^3$ of catalyst (apparent volume of bed) and represented by unit of H$^{-1}$) value be the same, the higher the waste gas speed is the more improved denitration is obtained. This is because of the fact that as the waste gas speed becomes higher, a film diffusion resistance on the catalyst surface against gas diffusion is decreased.

As a result, if the hydraulic diameter of each of the channels extending through the honeycomb-shaped catalyst is smaller than 2.0 mm, the soot and dust contained in the waste gas tends to clog the channel and increase the pressure drop, thereby making the NO$_x$ reduction efficiency substantially the same as that of the prior art technique. If the hydraulic diameter of each of the channels extending through the honeycomb-shaped catalyst exceeds 30 mm, the degree of denitration becomes degraded which is not desirous in practice.

If the open frontal area is smaller than 50%, the pressure drop becomes also considerably large and further the soot and dust contained in the waste gas tend to clog the channels. If the open frontal area exceeds 80%, the partition wall between two adjacent channels becomes so thin that sufficient mechanical strength of the honeycomb-shaped catalyst could not be obtained which is not desirous in practice.

If the waste gas speed is lower than 0.5 m/sec, the soot and dust contained in the waste gas tend to clog the channels after a long time and the NO$_x$ reduction efficiency tends to be degraded if compared with that for the same SV value. If the waste gas speed exceeds 60 m/sec, the pressure drop of the honeycomb-shaped catalyst bed becomes larger than 200 mm pressure head, which is not desirous in practice.

The invention will now be described in greater detail with reference to the accompanying single drawing which is a cross-sectional view showing an embodiment of a honeycomb-shaped catalyst practicing the method according to the invention.

The invention will be described with reference to the following practical example, but it is a matter of course that the invention is not limited to such example only.

EXAMPLE

In the present example, use was made of eight honeycomb-shaped catalysts (Samples Nos. 1 to 8) each formed of cordierite ceramic body (2MgO.2Al$_2$O$_3$.5SiO$_2$) and having a multiplicity of parallel channels extending therethrough and hexagonal in section as shown in the drawing. These Samples Nos. 1 to 8 had hydraulic diameters of 2.0 mm, 7.0 mm, 14.0 mm and 30 mm and open frontal area of 50% and 80% as shown in the following Table 1.

TABLE 1

|  | Sample No. | Hydraulic diameter of groove (mm) | Open frontal area (%) |
| --- | --- | --- | --- |
| Catalyst according to the invention | 1 | 2.0 | 50 |
|  | 2 | 2.0 | 80 |
|  | 3 | 7.0 | 50 |
|  | 4 | 7.0 | 80 |
|  | 5 | 14.0 | 50 |
|  | 6 | 14.0 | 80 |
|  | 7 | 30 | 50 |
|  | 8 | 30 | 80 |
| Reference catalyst | 9 | 1.7 | 80 |
|  | 10 | 30 | 40 |

The catalyst substance was comprised of 30 wt.% of V$_2$O$_5$, 10 wt.% of Cr$_2$O$_3$ and 60 wt.% of γ-Al$_2$O$_3$.

In addition, use was made of a reference catalyst as a Sample No. 9 having a hydraulic diameter of 1.7 mm and an open frontal area of 80% and another reference catalyst as a Sample No. 10 having a hydraulic diameter of 30 mm and an open frontal area of 40%. These reference catalysts comprised the same catalyst substances as those of the Samples Nos. 1 to 8.

Then, use was made of waste gas exhausted from a boiler heated by Bunker B oil having composition shown in the following Table 2.

TABLE 2

| Composition |  |
| --- | --- |
| CO$_2$ | 14 vol. % |
| H$_2$O | 10 vol. % |
| N$_2$ | 72 vol. % |
| O$_2$ | 4 vol. % |
| NO$_x$ | 250 ppm |
| SO$_x$ | 650 ppm |
| Soot and dust | 300 mg/Nm$^3$ |

Denitration tests on the waste gas having composition shown in the above Table 2 with the aid of Samples Nos. 1 to 10 were effected under the following conditions.

Waste gas speed: 0.2 m/sec.
0.5 m/sec, 1 m/sec, 10 m/sec,
30 m/sec and 60 m/sec.
Reaction temperature: 350° C.
NH$_3$/NO$_x$=1.00
SV=3,000 hr$^{-1}$, 5,000 hr$^{-1}$, 10,000 hr$^{-1}$, 20,000 hr$^{-1}$ and 30,000 hr$^{-1}$.

The results yielded from these denitration tests are shown in the following Table 3.

TABLE 3(a)

| Test No. | Sample No. | Gas speed (m/sec) | NO$_x$ reduction efficiency (%) | | | | | Pressure drop (mmH$_2$O/m) | | | | | |
| --- | --- | --- | --- | --- | --- | --- | --- | --- | --- | --- | --- | --- | --- |
| | | | | | | | | SV = 3000hr$^{-1}$ | | | SV = 30,000hr$^{-1}$ | | |
| | | | SV = 3000hr$^{-1}$ | SV = 5000hr$^{-1}$ | SV = 10000hr$^{-1}$ | SV = 20000hr$^{-1}$ | SV = 30000hr$^{-1}$ | After 10hrs | After 100hrs | After 1000hrs | After 10hrs | After 100hrs | After 1000hrs |
| 1 | 1 | 0.2 | 99 | 98 | 97 | 94 | 90 | 3.9 | 103 | 450 | 4.0 | 120 | 550 |
| 2 | 1 | 0.5 | 100 | 99 | 99 | 96 | 92 | 10 | 11 | 12 | 12 | 13 | 15 |
| 3 | 1 | 1 | 100 | 100 | 99 | 98 | 95 | 80 | 80 | 81 | 88 | 89 | 90 |
| 4 | 1 | 10 | 100 | 100 | 100 | 99 | 97 | 200 | 200 | 200 | 210 | 211 | 210 |
| 5 | 1 | 30 | 100 | 100 | 100 | 100 | 100 | 850 | 850 | 850 | 880 | 880 | 880 |
| 6 | 2 | 0.2 | 100 | 100 | 99 | 96 | 92 | 3.5 | 87 | 130 | 3.7 | 90 | 210 |

TABLE 3(a)-continued

| Test No. | Sample No. | Gas speed (m/sec) | NOx reduction efficiency (%) | | | | | Pressure drop (mmH2O/m) | | | | | |
|---|---|---|---|---|---|---|---|---|---|---|---|---|---|
| | | | | | | | | SV = 3000hr$^{-1}$ | | | SV = 30,000hr$^{-1}$ | | |
| | | | SV = 3000hr$^{-1}$ | SV = 5000hr$^{-1}$ | SV = 10000hr$^{-1}$ | SV = 20000hr$^{-1}$ | SV = 30000hr$^{-1}$ | After 10hrs | After 100hrs | After 1000hrs | After 10hrs | After 100hrs | After 1000hrs |
| 7 | 2 | 0.5 | 100 | 100 | 100 | 98 | 94 | 8 | 10 | 11 | 9 | 10 | 10 |
| 8 | 2 | 1 | 100 | 100 | 100 | 100 | 97 | 75 | 76 | 76 | 76 | 76 | 77 |
| 9 | 2 | 10 | 100 | 100 | 100 | 100 | 99 | 189 | 190 | 190 | 179 | 182 | 182 |
| 10 | 2 | 30 | 100 | 100 | 100 | 100 | 100 | 803 | 804 | 805 | 810 | 810 | 811 |
| 11 | 3 | 0.2 | 93 | 92 | 90 | 78 | 73 | 1.2 | 53 | 96 | 1.2 | 61 | 104 |
| 12 | 3 | 0.5 | 96 | 95 | 93 | 81 | 76 | 3.0 | 3.2 | 3.9 | 3.0 | 5.2 | 6.1 |
| 13 | 3 | 1 | 99 | 99 | 97 | 83 | 78 | 27 | 28 | 30 | 27 | 30 | 31 |
| 14 | 3 | 10 | 100 | 99 | 98 | 85 | 80 | 67 | 67 | 68 | 67 | 68 | 68 |
| 15 | 3 | 30 | 100 | 100 | 100 | 90 | 85 | 300 | 300 | 301 | 302 | 302 | 305 |
| 16 | 4 | 0.2 | 95 | 94 | 92 | 80 | 75 | 1.2 | 64 | 103 | 1.3 | 70 | 126 |
| 17 | 4 | 0.5 | 98 | 97 | 95 | 83 | 78 | 3.2 | 3.3 | 3.8 | 3.2 | 3.5 | 3.9 |
| 18 | 4 | 1 | 100 | 100 | 99 | 85 | 80 | 29 | 29 | 30 | 30 | 30 | 31 |

TABLE 3(b)

| Test No. | Sample No. | Gas speed (m/sec) | NOx reduction efficiency (%) | | | | | Pressure drop (mmH2O/m) | | | | | |
|---|---|---|---|---|---|---|---|---|---|---|---|---|---|
| | | | | | | | | SV = 3000hr$^{-1}$ | | | SV = 30000hr$^{-1}$ | | |
| | | | SV = 3000hr$^{-1}$ | SV = 5000hr$^{-1}$ | SV = 10000hr$^{-1}$ | SV = 20000hr$^{-1}$ | SV = 30000hr$^{-1}$ | After 10hrs | After 100hrs | After 1000hrs | After 10hrs | After 100hrs | After 1000hrs |
| 19 | 4 | 10 | 100 | 100 | 100 | 87 | 82 | 72 | 73 | 72 | 76 | 76 | 76 |
| 20 | 4 | 30 | 100 | 100 | 100 | 92 | 87 | 310 | 312 | 311 | 321 | 320 | 322 |
| 21 | 5 | 0.2 | 87 | 83 | 81 | 73 | 66 | 0.3 | 1.1 | 50 | 0.3 | 1.2 | 68 |
| 22 | 5 | 0.5 | 89 | 86 | 84 | 76 | 69 | 0.9 | 1.0 | 1.1 | 0.9 | 1.0 | 1.2 |
| 23 | 5 | 1 | 92 | 90 | 88 | 80 | 72 | 7.5 | 7.6 | 7.6 | 7.5 | 7.6 | 7.8 |
| 24 | 5 | 10 | 97 | 94 | 90 | 81 | 75 | 19 | 19 | 20 | 19 | 19 | 19 |
| 25 | 5 | 30 | 99 | 97 | 94 | 86 | 81 | 82 | 82 | 82 | 82 | 82 | 82 |
| 26 | 5 | 60 | 100 | 98 | 95 | 88 | 84 | 200 | 200 | 200 | 201 | 201 | 201 |
| 27 | 6 | 0.2 | 89 | 85 | 83 | 75 | 68 | 0.2 | 1.3 | 61 | 0.3 | 1.5 | 73 |
| 28 | 6 | 0.5 | 91 | 88 | 86 | 78 | 71 | 1.1 | 1.2 | 1.2 | 1.1 | 1.3 | 1.3 |
| 29 | 6 | 1 | 94 | 92 | 90 | 82 | 74 | 7.6 | 7.7 | 7.7 | 7.7 | 7.7 | 7.8 |
| 30 | 6 | 10 | 99 | 96 | 92 | 83 | 77 | 20 | 20 | 21 | 20 | 21 | 21 |
| 31 | 6 | 30 | 100 | 99 | 96 | 88 | 83 | 84 | 84 | 84 | 84 | 85 | 85 |
| 32 | 6 | 60 | 100 | 100 | 97 | 90 | 86 | 205 | 205 | 204 | 206 | 207 | 207 |
| 33 | 7 | 0.2 | 86 | 83 | 82 | 74 | 64 | 0.1 | 1.1 | 57 | 0.2 | 1.2 | 66 |
| 34 | 7 | 0.5 | 88 | 87 | 85 | 77 | 70 | 0.8 | 0.9 | 1.0 | 0.8 | 0.9 | 0.9 |
| 35 | 7 | 1 | 90 | 89 | 89 | 81 | 73 | 4.1 | 4.1 | 4.1 | 4.0 | 4.0 | 4.0 |
| 36 | 7 | 10 | 97 | 95 | 91 | 82 | 76 | 9.1 | 9.1 | 9.1 | 9.1 | 9.1 | 9.1 |

TABLE 3(c)

| Test No. | Sample No. | Gas speed (m/sec) | NOx reduction efficiency (%) | | | | | Pressure drop (mmH2O/m) | | | | | |
|---|---|---|---|---|---|---|---|---|---|---|---|---|---|
| | | | | | | | | SV = 3000hr$^{-1}$ | | | SV = 30000hr$^{-1}$ | | |
| | | | SV = 3000hr$^{-1}$ | SV = 5000hr$^{-1}$ | SV = 10000hr$^{-1}$ | SV = 20000hr$^{-1}$ | SV = 30000hr$^{-1}$ | After 10hrs | After 100hrs | After 1000hrs | After 10hrs | After 100hrs | After 1000hrs |
| 37 | 7 | 30 | 100 | 97 | 95 | 87 | 82 | 52 | 52 | 52 | 53 | 53 | 53 |
| 38 | 7 | 60 | 100 | 100 | 96 | 89 | 84 | 180 | 180 | 180 | 182 | 182 | |
| 39 | 8 | 0.2 | 87 | 85 | 83 | 75 | 65 | 0.02 | 0.03 | 2.3 | 0.01 | 0.01 | 3.2 |
| 40 | 8 | 0.5 | 89 | 87 | 85 | 78 | 71 | 0.03 | 0.03 | 0.04 | 0.03 | 0.03 | 0.04 |
| 41 | 8 | 1 | 91 | 90 | 90 | 83 | 74 | 0.1 | 0.1 | 0.1 | 0.1 | 0.1 | 0.1 |
| 42 | 8 | 10 | 98 | 96 | 92 | 84 | 77 | 3.2 | 3.2 | 3.2 | 3.2 | 3.2 | 3.2 |
| 43 | 8 | 30 | 100 | 98 | 96 | 89 | 83 | 10 | 10 | 10 | 11 | 11 | 11 |
| 44 | 8 | 60 | 100 | 100 | 97 | 90 | 85 | 51 | 51 | 51 | 52 | 52 | 52 |
| 45 | 9 | 0.2 | 100 | 100 | 98 | 94 | 92 | 12 | 290 | 860 | 14 | 330 | 920 |
| 46 | 9 | 0.5 | 100 | 100 | 99 | 96 | 94 | 20 | 340 | 880 | 25 | 460 | 1020 |
| 47 | 9 | 1 | 100 | 100 | 99 | 97 | 96 | 250 | 460 | 920 | 380 | 520 | 1160 |
| 48 | 9 | 10 | 100 | 100 | 99 | 98 | 97 | 600 | 830 | 1050 | 720 | 980 | 1260 |
| 49 | 9 | 0.2 | 54 | 52 | 48 | 40 | 32 | 0.2 | 6.5 | 120 | 0.3 | 12 | 208 |
| 50 | 10 | 0.5 | 60 | 58 | 52 | 43 | 33 | 1.0 | 57 | 206 | 1.2 | 83 | 270 |
| 51 | 10 | 1 | 62 | 60 | 56 | 47 | 35 | 5.2 | 88 | 260 | 5.5 | 100 | 290 |
| 52 | 10 | 10 | 74 | 70 | 63 | 49 | 37 | 12.0 | 160 | 310 | 14.0 | 190 | 400 |
| 53 | 10 | 30 | 78 | 73 | 70 | 52 | 40 | 38 | 240 | 520 | 42 | 280 | 680 |
| 54 | 10 | 60 | 82 | 80 | 65 | 55 | 43 | 140 | 480 | 630 | 150 | 560 | 1020 |

In addition, changes of pressure drop of the honeycomb-shaped beds were measured under the following conditions.

SV = 3,000 hr$^{-1}$ and 30,000 hr$^{-1}$ after 10 hrs, 100 hrs and 1,000 hrs.

The results yielded from these measurements are also shown in the above Table 3.

As seen from the Table 3, the NOx reduction efficiency of the Samples Nos. 1 to 8 is larger than 69% at a waste gas speed of 0.5 m/sec to 60 m/sec. In addition, the higher the waste gas speed the larger the NOx reduction efficiency obtained at the same SV value. The increase of the pressure drop of the Samples Nos. 1 to 8 at the waste gas speed of 0.5 m/sec to 60 m/sec is small. On the contrary, the increase of the pressure drop of the Samples Nos. 1 to 8 at a gas speed of 0.2 m/sec becomes extremely large.

On the other hand, the pressure drop of the reference Samples Nos. 9 and 10 is suddenly increased irrespectively of the waste gas speeds. That is, in the reference Sample No. 9 whose hydraulic diameter is 1.7 mm and open frontal area is 80% and the reference Sample No. 10 whose hydraulic diameter is 30 mm and open frontal area is 40%, the soot and dust contained in the waste gas exhausted from the boiler heated exclusively by Bunker B oil cause the channels extending through the honeycomb-shaped catalyst to clog after 100 hours, thereby increasing the pressure drop.

Observation tests on both the Samples Nos. 1 and 8 according to the invention and the reference Samples Nos. 9 and 10 have shown the result that the soot and dust cause no clogging of the channels extending through the Samples Nos. 1 to 8 at the waste gas speed of 0.5 m/sec to 60 m/sec, and that the soot and dust are uniformly adhered to all of the channels extending through the reference Sample No. 9 thereby reducing its hydraulic diameter to smaller than 1 mm. The reference Sample No. 10 has an open frontal area of 40%, so that the wall thickness of the honeycomb-shaped catalyst is so large that a very substantial amount of soot and dust are adhered to the gas inlet side of the catalyst bed. As a result, the hydraulic diameter of the gas inlet side of the catalyst bed which had originally been 30 mm became smaller than 1 mm. That is, the soot and dust were rapidly deposited on that part of the honeycomb-shaped catalyst which has a large wall thickness. The channel extending through the honeycomb-shaped catalyst was clogged more and more with the soot and dust which were grown starting from the above mentioned deposited product. If the open frontal area exceeds 50% and hence the wall thickness becomes thin, the above described deposition phenomenon is eliminated and the channel extending through the honeycomb-shaped catalyst is not clogged with the soot and dust. On the contrary, if the waste gas flows at a speed lower than 0.5 m/sec, the deposition phenomenon occurs thus resulting in an increase of the pressure drop.

As can be seen from the above example, the method of removing nitrogen oxides from waste gas according to the invention provides an economical way of obtaining a high denitration characteristic without increasing the pressure drop due to clogging of the channel extending through the honeycomb-shaped catalyst by removing nitrogen oxides contained in waste gas by bringing the waste gas together with ammonia gas added thereto into contact with a catalyst under conditions that the hydraulic diameter of the channel extending through the honeycomb-shaped catalyst is larger than 2.0 mm, that the open frontal area is larger than 50% and that the waste gas speed is higher than 0.5 m/sec. In particular, the invention provides a method of removing nitrogen oxides from a high speed waste gas exhausted from various kinds of workshops in a high yield, which contributes greatly as a prevention against public pollution.

What is claimed is:

1. In a method of removing nitrogen oxides from dirty, dust or soot containing waste gases from stationary fossil fuel burning sources by selective catalytic reduction, comprising adding ammonia gas to said waste gas, and bringing said waste gas containing ammonia gas into contact with a ceramic honeycomb structural body having catalyst material on or in the channel walls thereof, said catalyst material comprising a metal or metal oxide effective for reducing nitrogen oxides in the presence of ammonia to nitrogen and water, the improvement comprising passing said waste gas through said honeycomb body at a gas speed of 0.5–60 m/sec, said body having walls of substantially uniform thickness forming channels extending through said body, said channels having a hydraulic diameter of 2.0–30 mm, and said body having an open frontal area of 50–80%, said body causing a pressure drop of said waste gases passing through said body of not greater than 200 mm. of $H_2O$ thereby attaining reduction of nitrogen oxides to nitrogen and preventing the channels from being clogged by said dust or soot.

* * * * *